(12) United States Patent
Peterzell et al.

(10) Patent No.: US 6,374,116 B1
(45) Date of Patent: Apr. 16, 2002

(54) ADJUSTING MAXIMUM TRANSMIT POWER TO MAINTAIN CONSTANT MARGIN FOR ADJACENT CHANNEL POWER REJECTION

(75) Inventors: Paul Peterzell; Sheikh A. Hafiz, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/401,578

(22) Filed: Sep. 22, 1999

Related U.S. Application Data (60) Provisional application No. 60/139,691, filed on Jun. 14, 1999.

(51) Int. Cl.[7] .............................. H04B 1/04; H04B 1/38
(52) U.S. Cl. .................... 455/522; 455/69; 455/115; 455/126; 455/138; 455/232.1; 455/250.1
(58) Field of Search ........................ 455/69, 550, 115, 455/123, 125, 126, 127, 95, 192.1, 195.1, 136, 138, 113, 232.1, 234.1, 240.1, 250.1, 522, 522.1, 522.2

(56) References Cited

U.S. PATENT DOCUMENTS

| | | | | |
|---|---|---|---|---|
| 5,471,654 A | * | 11/1995 | Okazaki et al. | 455/126 |
| 5,627,857 A | * | 5/1997 | Wilson | 455/115 |
| 5,631,921 A | * | 5/1997 | Schilling | 455/115 |
| 5,708,681 A | * | 1/1998 | Malkenes et al. | 455/127 |
| 5,732,334 A | * | 3/1998 | Miyake | 455/126 |
| 6,018,650 A | * | 1/2000 | Petsko et al. | 455/234.1 |

* cited by examiner

Primary Examiner—Lee Nguyen
Assistant Examiner—Simon Nguyen
(74) Attorney, Agent, or Firm—Philip P. Wadsworth; Charles D. Brown; Howard H. Seo (57) ABSTRACT

A method of adjusting transmit power in a CDMA portable phone to maintain adjacent channel power rejection (ACPR) passing margin includes the steps of amplifying a first radio frequency (RF) signal according to a first gain to produce a second RF signal, and amplifying the second RF signal according to a second gain to produce a third RF signal. A desired power level of the third RF signal is determined and a new gain value is computed from the desired power level. The first gain value is adjusted to the new value. A system for adjusting transmit power in a CDMA portable phone to maintain adjacent channel power rejection (ACPR) passing margin includes an automatic gain control (AGC) amplifier having an AGC input terminal, an AGC output terminal, and a control signal input terminal. The system also includes a power amplifier (PA) having a PA input terminal and a PA output terminal, wherein the PA input terminal is connected to the AGC output terminal. In addition, the system includes an output power controller having a controller input terminal and a controller output terminal, wherein the controller input terminal is connected to the PA output terminal and the controller output terminal is connected to the AGC input terminal.

18 Claims, 12 Drawing Sheets

ADJUSTING MAXIMUM TRANSMIT POWER TO MAINTAIN CONSTANT MARGIN FOR ADJACENT CHANNEL POWER REJECTION

This application claims benefit of provisional application No. 60/139,691, filed Jun. 14, 1999.

BACKGROUND OF THE INVENTION

I. Field of the Invention

The present invention generally relates to wireless telephones. More specifically, the present invention relates to techniques involving the automatic adjustment of RF amplification circuitry.

I. Description of the Related Art

Signals transmitted by wireless telephones are required to satisfy various requirements. For instance, Code Division Multiple Access (CDMA) cellular phones are mandated by the FCC to limit out of channel distortion when transmitting in the radio frequency (RF) spectrum. Adjacent Channel Power Rejection (ACPR) is a metric frequently used to measure out of channel distortion. ACPR is represented as a curve across the spectrum that is centered at a transmitted RF signal's center frequency. At this center frequency, an ACPR curve is at its maximum. However, an ACPR curve symmetrically attenuates as frequencies depart from this center frequency. ACPR curves are compared against the spectral power characteristics of transmitted RF signals. Current CDMA standards, such as IS-98, require the spectral power characteristics of transmitted CDMA signals to be below a defined maximum ACPR curve at all frequencies and transmit power levels. When a signal complies with such a requirement, the signal is said to have passing margin. When a signal fails to comply with such a requirement, its out of channel distortion is excessive.

A wireless phone contains components that amplify RF signals so that they have sufficient power for transmission. Before amplification, a properly modulated RF signal has negligible out of channel distortion. An amplified signal's out of channel distortion will also be negligible if the amplification process is linear. However, if a signal has been amplified by a non-linear amplification process, its spectrum will include increased out of channel distortion. This increased out of channel distortion may cause a wireless phone to exceed the maximum allowed ACPR.

Electronic amplifiers are generally linear devices. However, under certain conditions, amplifiers will behave in a non-linear fashion. These conditions include low supply voltage and high temperature. Non-linear performance can be reduced by adjusting the output power produced through amplification. This reduction of non-linear performance will also reduce out of channel distortion. What is needed is a way to monitor operating conditions to provide the maximum possible output power without surpassing specified ACPR limits.

SUMMARY OF THE INVENTION

The present invention is a method and system for maintaining adjacent channel power rejection (ACPR) passing margin. The method and system involves the control of an automatic gain control (AGC) amplifier to achieve a power amplifier (PA) output power that is appropriate for the operating conditions.

A method of the present invention includes amplifying a first radio frequency (RF) signal according to a first gain to produce a second RF signal and amplifying the second RF signal according to a second gain to produce a third RF signal. The method also includes determining a desired power level of the third RF signal, computing a new gain value from the desired power level, and adjusting the first gain to the new value.

A system of the present invention includes an automatic gain control (AGC) amplifier having an AGC input terminal, an AGC output terminal, and a control signal input terminal. The system also includes a power amplifier (PA) having a PA input terminal and a PA output terminal, wherein the PA input terminal is connected to the AGC output terminal. In addition, the system includes an output power controller having a controller input terminal and a controller output terminal, wherein the controller input terminal is connected to the PA output terminal and the controller output terminal is connected to the AGC input terminal.

An advantage of the present invention is the maintenance of ACPR passing margin throughout a range of operating voltages and temperatures without unduly compromising output power.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
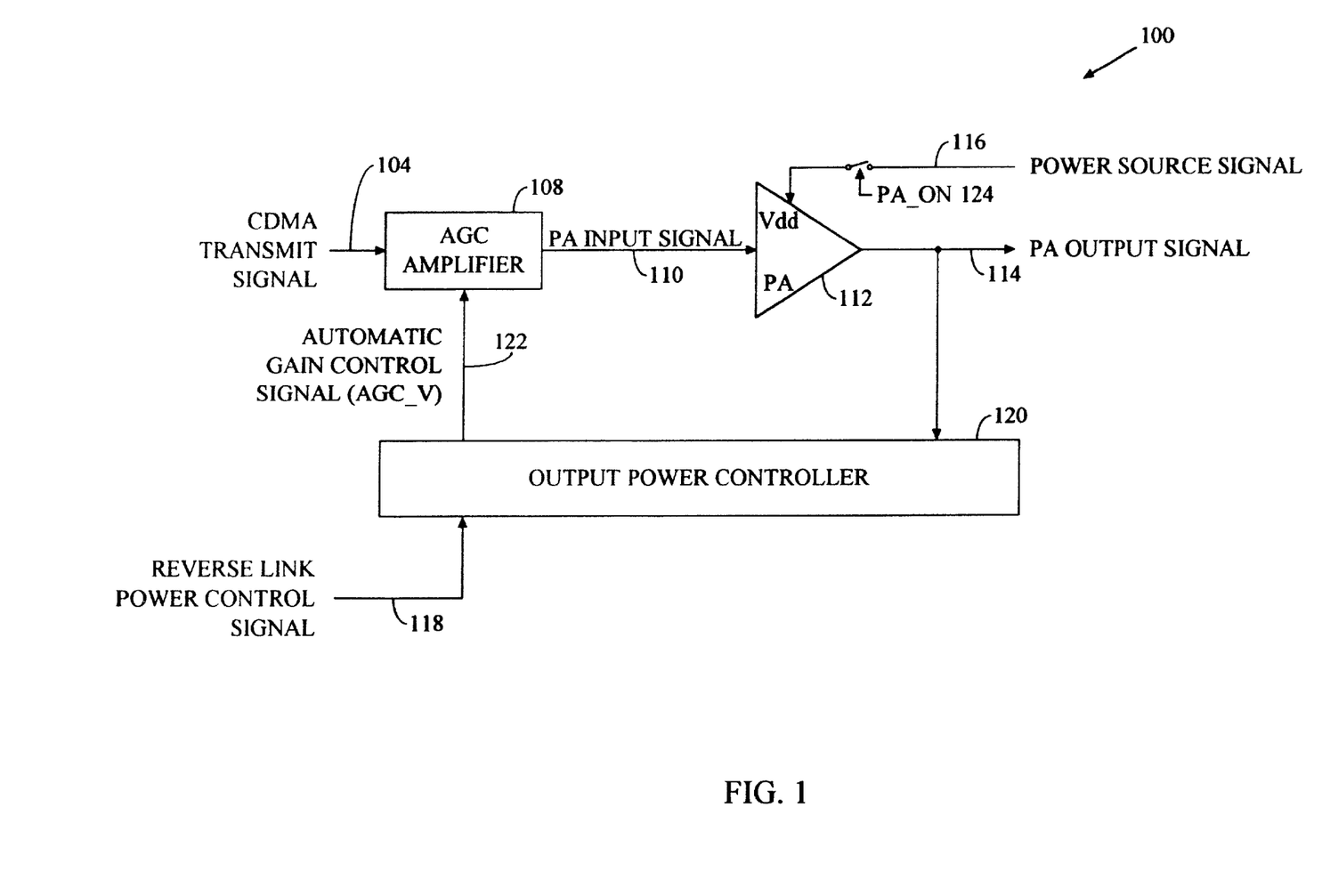
FIG. 1 illustrates an RF amplification circuit according to the invention.

FIG. 1 illustrates an RF amplification circuit 100 in a wireless CDMA telephone according to a preferred embodiment of the present invention. This amplification circuit comprises several components. These components include an automatic gain control (AGC) amplifier 108, a power amplifier (PA) 112, and an output power controller 120. Several signals are associated with this amplification circuit. These signals include a CDMA transmit signal 104, a PA input signal 110, a PA output signal 114, a power source signal 116, a reverse link power control signal 118, an automatic gain control signal (AGC_V) 122, and a PA_ON 124.

AGC amplifier 108 receives CDMA transmit signal 104 and amplifies it according to an adjustable gain. In a preferred embodiment, this signal is at a fixed power level. This enables predictable performance of RF amplification circuit 100. This amplified signal is output by AGC amplifier 108 as PA input signal 110.

The gain of AGC amplifier 108 is controlled by automatic gain control signal (AGC_V) 122. In a preferred embodiment, this signal is an electrical voltage or current that can be varied to adjust the gain of AGC amplifier 108. Increasing the voltage of analog control signal 122 also increases the gain of AGC amplifier 108. In an alternate embodiment, the gain of AGC amplifier 108 can be controlled by a digital signal.

PA 112 is a power amplifier that amplifies PA input signal 110. This amplified signal is output by PA 112 as PA output signal 114. In a preferred embodiment, PA output signal 114 is directed to an antenna segment of a CDMA phone for wireless transmission. PA 112 operates according to a fixed gain. However, in alternate embodiments, PA 112 can have an adjustable gain. The performance of PA 112 is typically measured by the power level of PA output signal 110.

In a preferred embodiment, CDMA transmit signal, PA input signal 110, and PA output signal 114 are all RF signals. In other words, these signals exist in the RF spectrum. However, in alternate embodiments, these signals could exist in other frequency ranges.

As illustrated in FIG. 1, PA 112 accepts power source signal 116. In a preferred embodiment, power source signal 116 is a direct current (DC) voltage. This voltage signal is also known as Vdd. Power source signal can be generated by a battery or other external power source. Typical batteries include lithiumion and nickel-metal hydride batteries. Examples of external power sources include car cigarette lighters, and household alternating current (AC) power converted to a DC voltage. Power source signal 116 can be interrupted by PA_ON 124. PA_ON 124 is a signal that is triggered when a wireless phone is in standby mode. This interrupt capability reduces the current draw on power sources, thereby conserving energy.

Output power controller 120 automatically controls the output power by adjusting AGC_V 122. Specifically, output power controller 120 controls the magnitude of AGC_V 122. In a preferred embodiment, output power controller 120 accepts PA output signal 114, and reverse link power control signal 118 as input signals. These input signals are then manipulated according a process described with respect to FIG. 3 to generate automatic gain control signal (AGC_V) 122.

Output power controller 120 accepts PA output signal 114 to estimate the power level of PA output signal 114. In a preferred embodiment, output power controller also monitors signals representing ambient temperature and the DC supply voltage. These signals are used by output power controller 120 to determine a maximum allowable power level of PA output signal 114.

Output power controller 120 also accepts reverse link power control signal 118 to perform in accordance with directives received from cellular base stations. Digital reverse link power control signal 118 is a digital signal. In a preferred embodiment, this signal is derived from directives received from a cellular base station via a cellular network channel that is dedicated to overhead traffic. These directives command a wireless phone to adjust the power level of PA output signal 114. Output power controller 120 considers these directives in conjunction with the determined maximum allowable power level of PA output signal 114. A desired power level of PA output signal 114 results from this consideration. In an alternate embodiment, output power controller 120 does not consider digital reverse link power control signal 118. Instead, output power controller 120 equates desired power level to maximum allowable power level. Output power controller 120 then converts this desired power level into AGC_V 122 having the appropriate magnitude.

Figure 2:
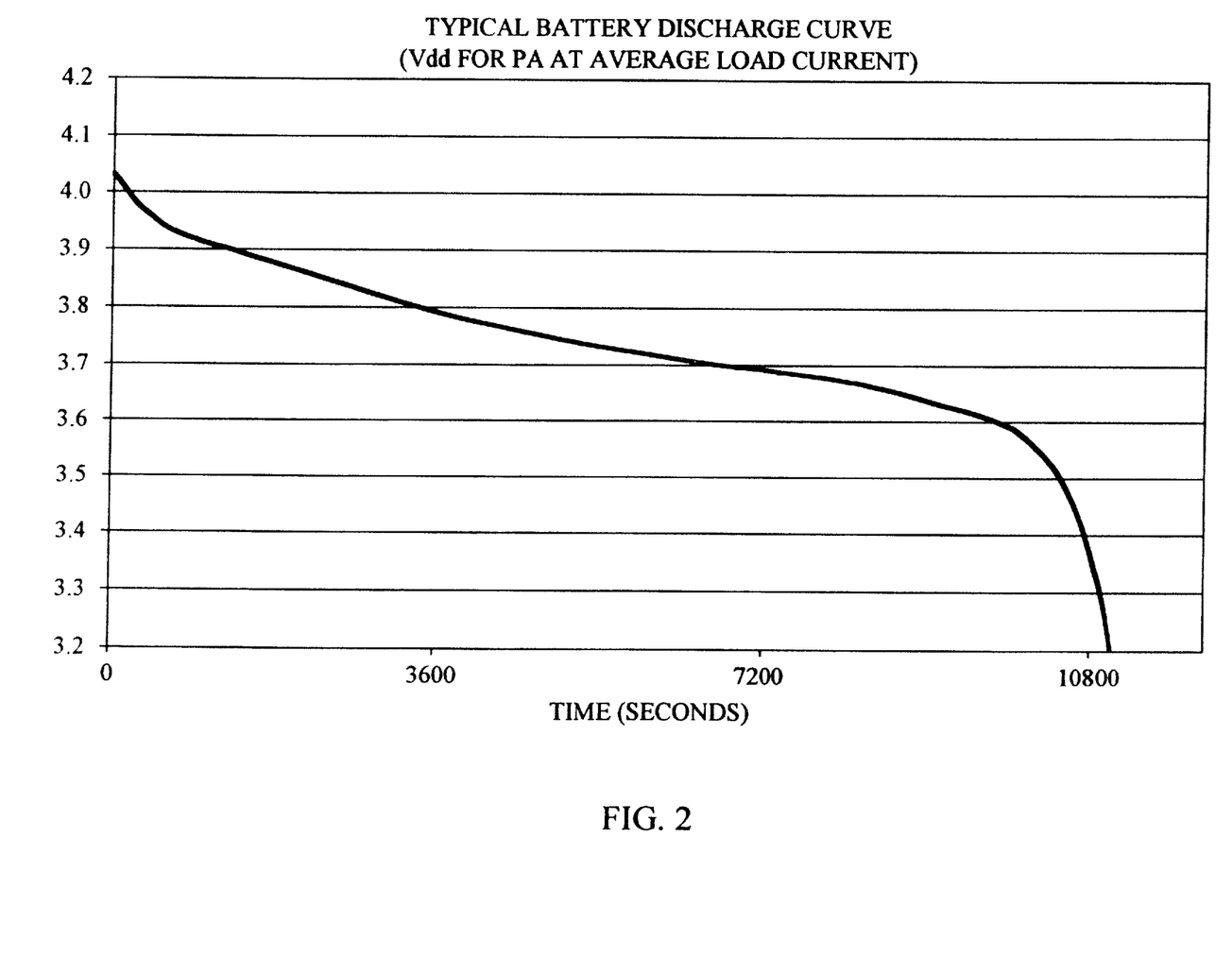
FIG. 2 illustrates a typical battery discharge curve.

FIG. 2 illustrates a battery discharge curve. This curve depicts the typical decline of a battery's voltage over time as it supplies electrical current necessary to support wireless phone calls. This discharge curve profiles a time interval when battery voltage declines from 4.1 Volts to 3.2 Volts. As illustrated by this curve, the battery's voltage is greater than 3.7 Volts for the majority of this interval. A battery's voltage also fluctuates according to temperature. In general, as temperature increases, so does a battery's voltage.

Wireless telephones are capable of operating across a range of voltages. However, for all wireless phones, there is a minimum operational voltage. If a wireless phone's power source fails to supply power above this voltage, the phone will not function properly. A typical minimum operational voltage for CDMA wireless phones is 3.0 Volts. As illustrated by FIG. 2, if a wireless phone is powered by a battery, it will operate at voltages above this minimum operational voltage for a significant amount of time.

When a wireless telephone is operating at voltages greater than the minimum operational voltage, the particular operating voltage affects the performance characteristics of RF amplification circuit 100. This principle is evident when RF amplification circuit 100 is calibrated to generate PA output signal 114 at a certain power level. For a given output power calibration, the non-linear characteristics of RF amplification circuit 100 will increase as the operating voltage decreases. As discussed above, increased out of channel distortion is a manifestation of an increase in non-linear amplification characteristics.

Figure 3A:
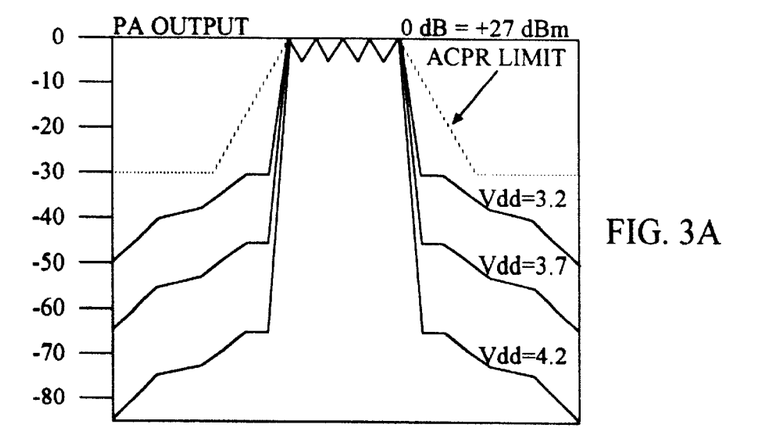
FIGS. 3A, 3B, and 3C illustrate the spectral characteristics of amplification circuit output signals.
Figure 3B:
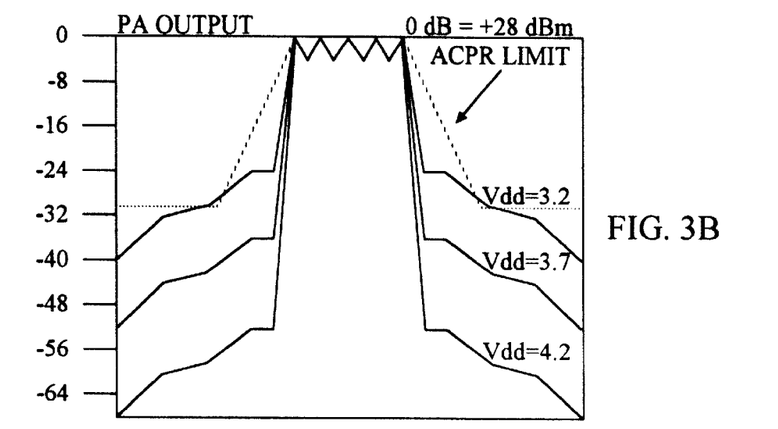
Figure 3C:
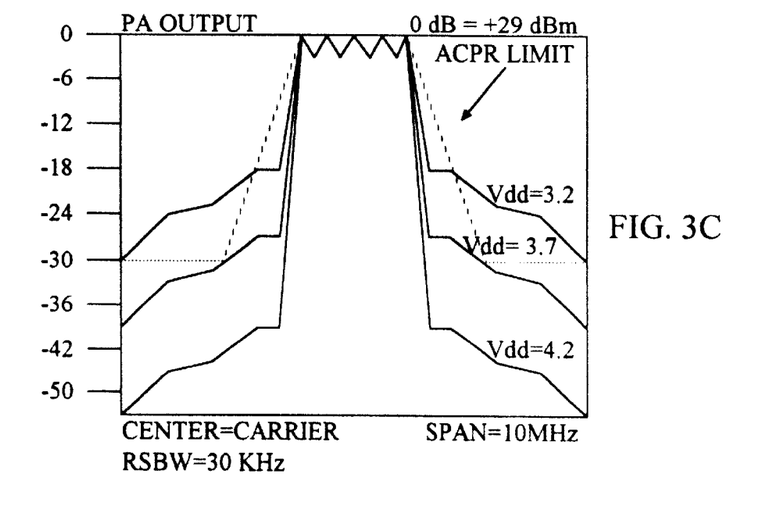

FIGS. 3A, 3B, and 3C illustrate the spectral characteristics of PA output signal 114 as a function of the power level of PA output signal 114 and RF amplification circuit's 100 operating voltage. Each of these figures contains three curves of solid lines. These curves represent the spectral characteristics of a PA output signal 114 when the operating voltage is either 3.2, 3.7, or 4.2 Volts. Each of these solid line curves has a center lobe and two side lobes. The center lobes exist is the middle of the depicted spectrum and have a larger magnitude than the side lobes that exist to the left and right of each center lobe. The center lobes represent the power of PA output signal 114 inside its designated RF transmission channel. The side lobes represent the power of PA output signal 114 outside of its designated RF transmission channel. This indicates the amount of out of channel distortion. In FIGS. 3A, 3B, and 3C, each center lobe is of equal magnitude. In contrast, the side lobe magnitudes vary according to operating voltage. Thus, out of channel distortion varies according to operating voltage.

Each of these figures also contains a dotted line curve. This dotted line curve is the ACPR limit. As stated above, the spectral characteristics of PA output signal 114 cannot exceed this limit. In particular, FIG. 3C shows that as operating voltage decreases, the out of channel distortion of PA output signal 114 increases and eventually exceeds the ACPR limit. For example, when the operating voltage is either 4.2 Volts or 3.7 Volts, PA output signal 114 is within the ACPR limit. In other words, there is passing margin. However, when the operating voltage is 3.2 Volts, PA output signal 114 exceeds the ACPR limit. In this situation, no passing margin exists.

When considering the characteristics described above in light of the fact that operating voltages fluctuate, RF amplification circuit 100 must employ techniques to ensure that ACPR limits are not exceeded at any operating voltage.

A conventional technique for guaranteeing compliance with ACPR requirements involves the static calibration of a wireless phone's amplification characteristics during production. This calibration technique involves powering a phone with its minimum operational voltage and adjusting AGC_V 122 so that PA output signal 114 yields the maximum possible power without exceeding a specified ACPR limit at this minimum voltage. This technique is termed static calibration because once AGC_V 122 is set, it will not be adjusted. Therefore, according to this technique, output power controller 120 merely provides a constant AGC_V 122.

Static calibration is performed at minimum operational voltage because RF amplification circuit 100 is most susceptible to non-linear performance at this voltage. However, static calibration is a less than optimal solution. Since the voltage of power source signal 116 is typically greater than the minimum operating voltage, RF amplification circuit 100 is often capable of producing a higher power PA output signal 114 without exceeding a specified ACPR limit. Therefore, in a preferred embodiment, output power controller 120 dynamically controls AGC_V 122 in a manner that enables RF amplifier circuit 100 to produce a maximum power with passing margin.

Figure 4:
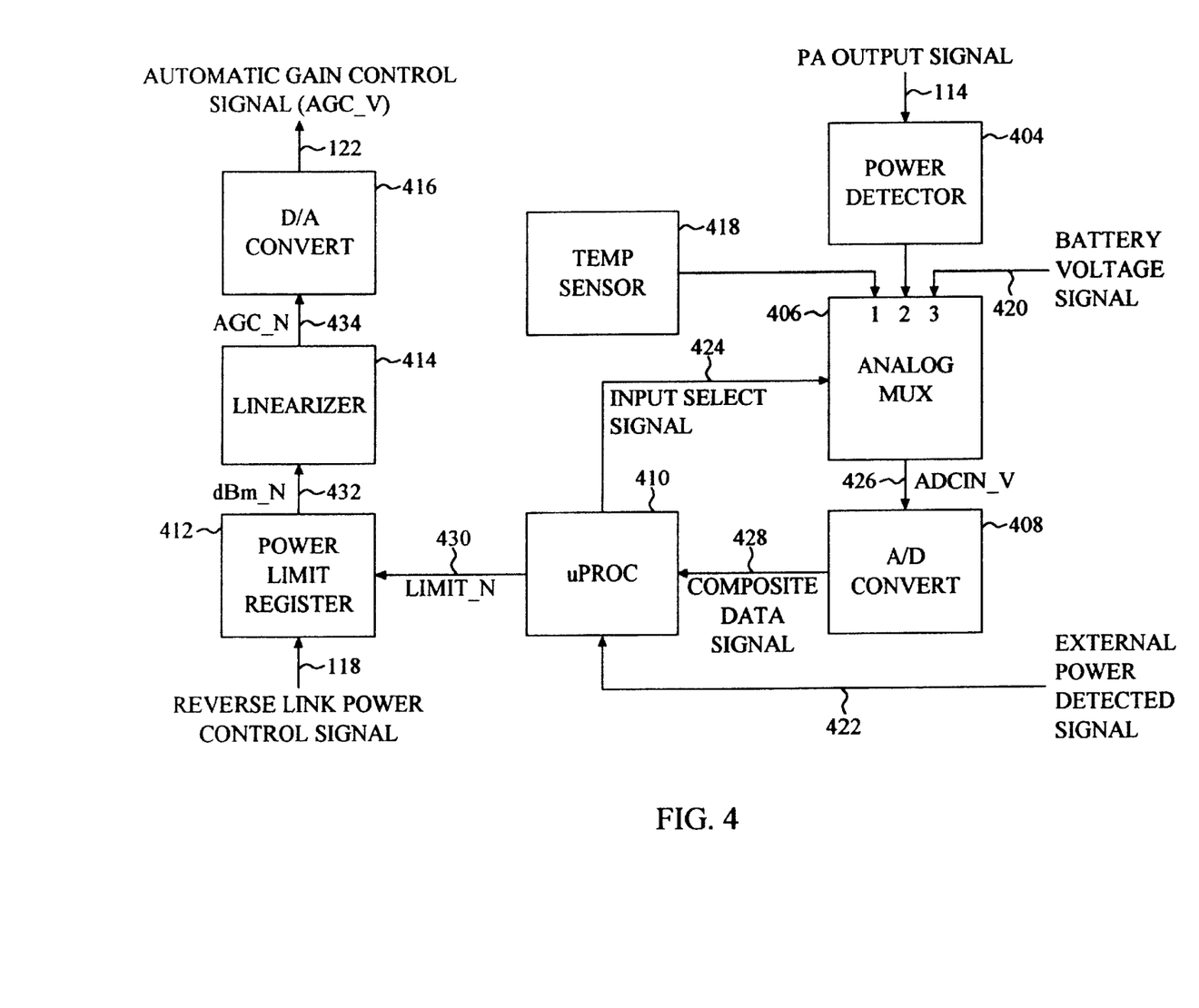
FIG. 4 illustrates an output power controller according to the invention.

FIG. 4 illustrates output power controller 120 according to a preferred embodiment. Output power controller 120 comprises several components. These components include a power detector 404, an analog multiplexer 406, an analog to digital (A/D) converter 408, a processor 410, a power limit register 412, a linearizer 414, a digital to analog (D/A) converter 416, and a temperature sensor 418.

Power detector 404 accepts PA output signal 114 and estimates the power of this signal. In a preferred embodiment, power detector 404 can detect RF power over a 30 dB range having an upper limit of 1 watt and a lower limit of 1 milliwatt. Power detector 404 also generates an analog signal that is proportional to this power estimate. In a preferred embodiment, this analog signal is a DC voltage that is linearly proportional to the power level of PA output signal 114. Power detector 404 sends this analog signal to an input port on analog multiplexer 406. Power detector 404 can be implemented with analog circuitry, digital processing algorithms, or any other power detection and estimation means known to persons skilled in the relevant arts.

Temperature sensor 418 converts the ambient temperature of RF amplification circuit 100 into a temperature signal 436. In a preferred embodiment, this temperature signal is a DC voltage that is linearly proportional to the ambient temperature. Temperature sensor 418 sends this analog signal to an input port on analog multiplexer 406. An exemplary temperature sensor 418 is a thermocouple.

Battery voltage signal 420 indicates the operating voltage of RF amplification circuit 100. In a preferred embodiment, battery voltage signal 420 is simply the battery voltage. This voltage can be obtained by connecting conductors to each battery terminal.

Analog multiplexer 406 has input ports to accept analog signals generated by power detector 404 and temperature sensor 418. Analog multiplexer 406 also has an input port to accept battery voltage signal 420. In a preferred embodiment, analog multiplexer 406 time division multiplexes these signals into a single output signal that is timed according to an input select signal 424. Input select signal 424 is received from processor 410. This single output signal will be referred to as ADCIN_V 426. ADCIN_V 426 comprises information regarding the power level of PA output signal 114, the ambient temperature of RF amplification circuit 100, and battery voltage signal 420. Analog multiplexer 406 sends ADCIN_V 426 to an input port of A/D converter 408.

A/D converter 408 accepts ADCIN_V 426 via an input port and converts it into a composite data signal 428. Composite data signal 428 comprises three distinct digital signals: TEMP_N, PO_N, and BATT_N. These three digital signals quantitatively describe the power level of PA output signal 114, the ambient temperature of RF amplification circuit 100, and the magnitude of battery voltage signal 420. A/D converter 408 converts these analog signals into TEMP_N, PO_N, and BATT_N according to defined relationships. These relationships are described below. In a preferred embodiment, A/D converter 408 uses eight bits to encode these digital signals. A/D converter 408 sends these signals to processor 410 according to a standard computer bus architecture. In an alternate embodiment, these signals are sent to processor according to any data interface known to persons skilled in the relevant arts.

Figure 5:
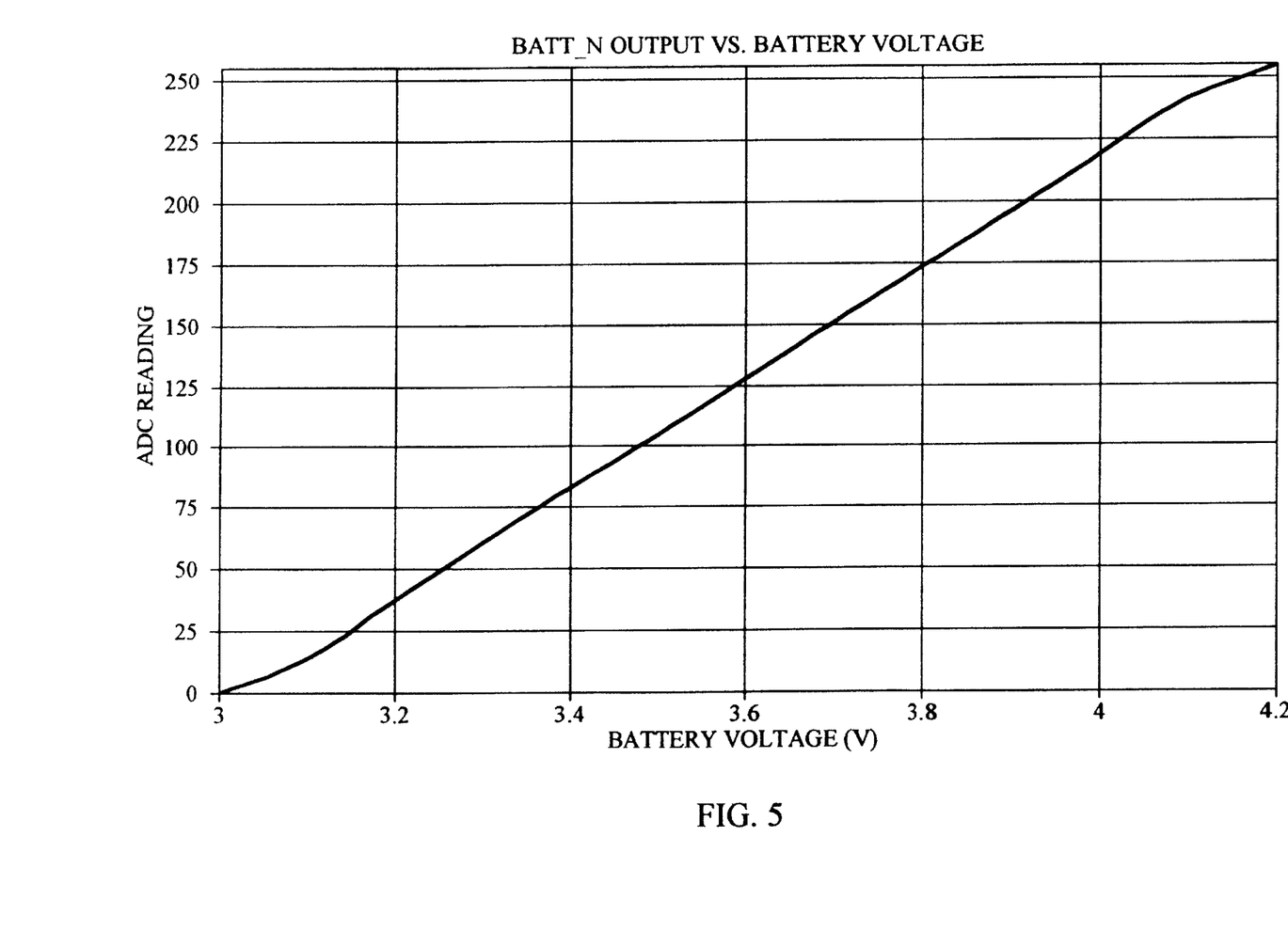
FIG. 5 illustrates a relationship between a battery voltage signal and a digital battery voltage signal according to the invention.

FIG. 5 is a curve illustrating the relationship between BATT_N and battery voltage signal 420 according to a preferred embodiment. BATT_N is a quantized digital signal represented by eight bits. Battery voltage signal 420 is represented in Volts. As illustrated, the relationship between BATT_N and battery voltage signal 420 is essentially linear. However, in alternate embodiments, this curve can have any shape.

Figure 6:
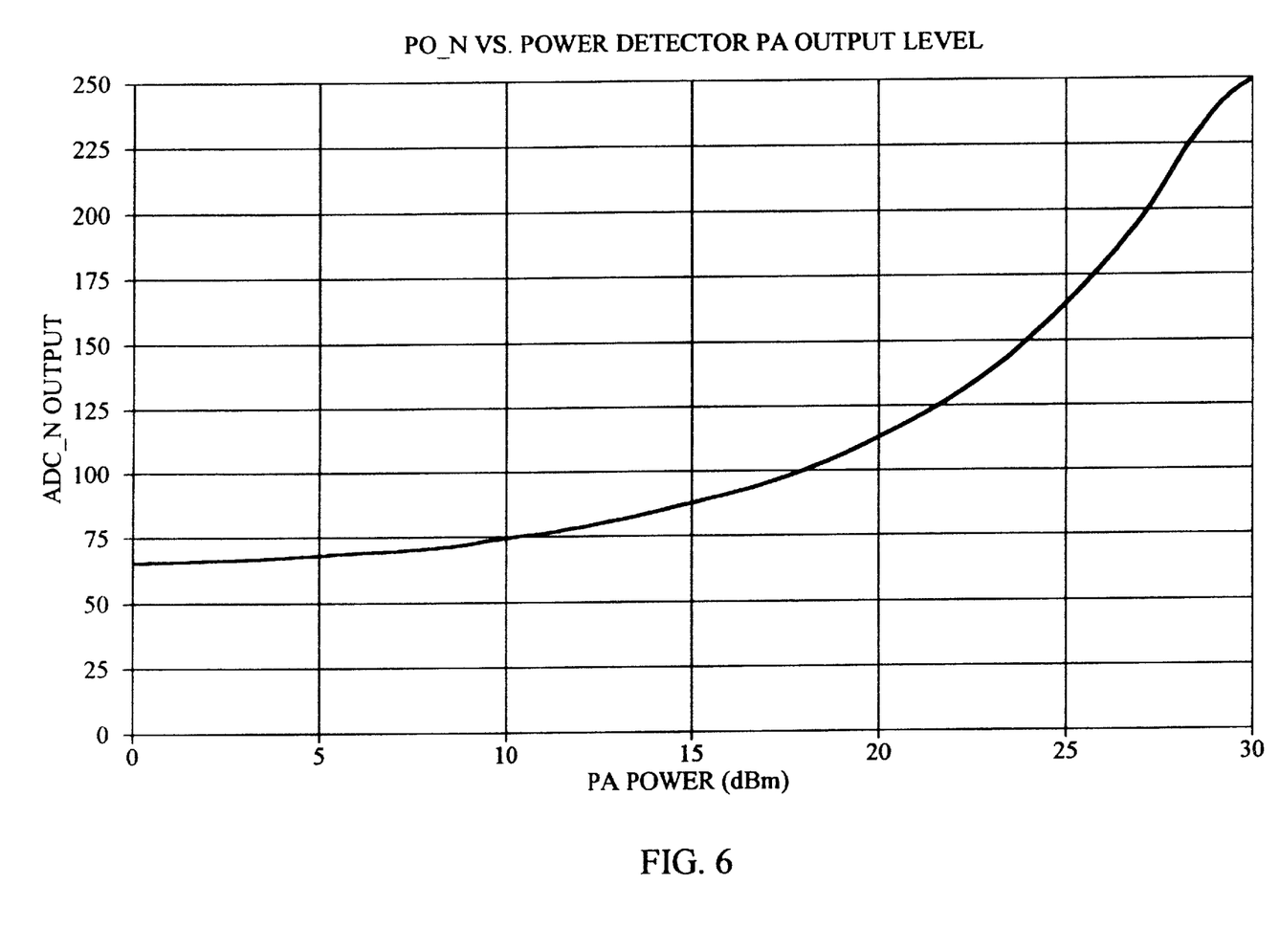
FIG. 6 illustrates a relationship between the power level of a power amplifier output signal and a digital power signal according to the invention.

FIG. 6 is a curve illustrating the relationship between PO_N and the power level of PA output signal 114 according to a preferred embodiment. PO_N is a quantized digital signal represented by eight bits. The power level of PA output signal 114 is represented in decibels with respect to a milliwatt (dBm). As illustrated, PO_N increases exponentially with the power level of PA output signal 114. However, this curve can have any shape.

Figure 7:
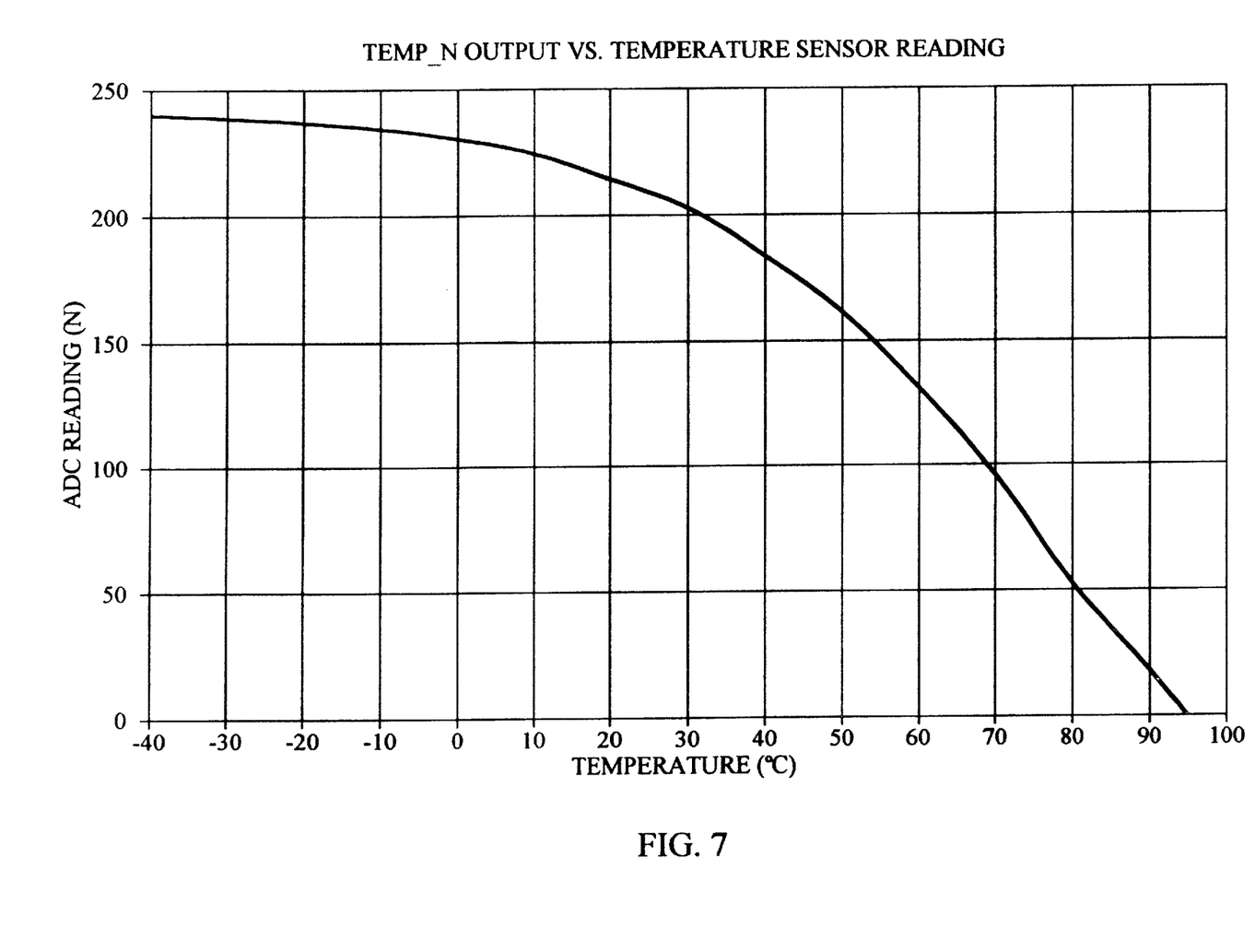
FIG. 7 illustrates a relationship between the ambient temperature of an RF amplification circuit and a digital temperature signal according to the invention.

FIG. 7 is a curve illustrating the relationship between TEMP_N and the ambient temperature of RF amplification circuit 100 according to a preferred embodiment. TEMP_N is a quantized digital signal represented by eight bits. The ambient temperature of RF amplification circuit 100 is represented by degrees Celsius. As illustrated, TEMP_N decreases monotonically as the ambient temperature of RF amplification circuit 100 increases. However, this curve can have any shape.

Processor 410 is any component that can perform algorithms. Processor 410 also contains memory for information access and storage. In a preferred embodiment, processor 410 is a microprocessor. However, in alternate embodiments, processor 410 may comprise processing capability dispersed among one or more application specific integrated circuits (ASICs) or other hardware capable of performing algorithms. Exemplary processors 410 include reduced instruction set computer (RISC) processors, microcontrollers, finite state machines, personal computer processors, and the mobile station modem (MSM) chip. Processor 410 accepts TEMP_N, PO_N, and BATT_N from A/D converter 408 and performs an algorithm that sets the maximum allowable power level of PA output signal 114. This maximum allowable power level is output by processor 410 as LIMIT_N 430. LIMIT_N 430 is an eight bit digital signal sent to power limit register 412 according to a standard computer bus architecture. In an alternate embodiment, LIMIT_N 430 is sent to power limit register 412 according to any data interface known to persons skilled in the relevant arts.

Processor 410 generates LIMIT_N 430 according to an algorithm. This algorithm can be described at an abstract level with the following equation:

LIMIT_N=f(BATT_N, TEMP_N, PO_N, external power detected signal 422)

The above equation states that LIMIT_N 430 is determined according to a mathematical function that is dependent on four signals: BATT_N, TEMP_N, PO_N, and external power detected signal 422. Processor 410 can perform this function through mathematical computation. However, in a preferred embodiment, processor 410 performs this function by acccessing a lookup table containing pre-compiled values.

Figure 8:
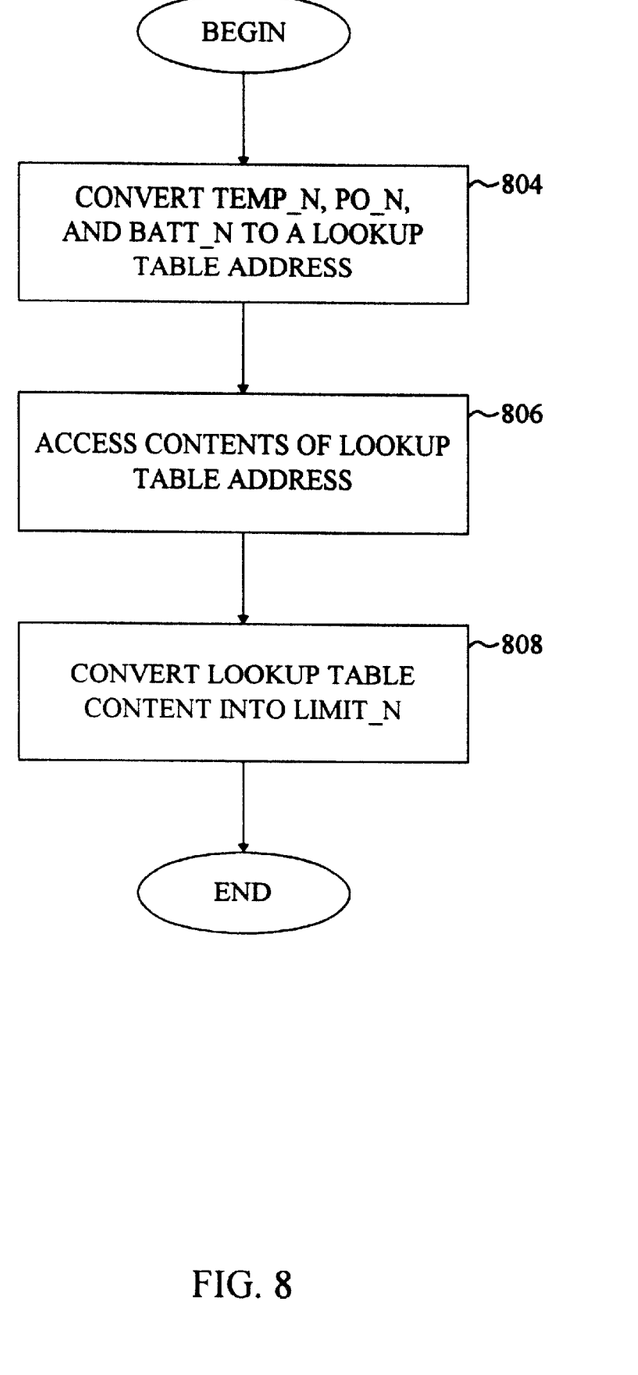
FIG. 8 is a flowchart illustrating a lookup table algorithm performed by a processor according to the invention.

FIG. 8 is a flowchart illustrating a lookup table algorithm performed by processor 410 according to a preferred embodiment. The algorithm begins with step 804. In this step, processor 410 converts TEMP_N, PO_N, and BATT_N into a lookup table address. Next, in step 806, processor 410 accesses the contents of this lookup table address. The contents of this address specify the maximum achievable power level of PA output signal 114 that will satisfy specified ACPR requirements. Step 808 is performed next. In step 808, processor 410 converts the accessed table entry into LIMIT_N 430. As described above, LIMIT_N 430 is a digital signal that can be represented by any number of bits.

The lookup table described above contains maximum power levels of PA output signal 114 that satisfy a specified ACPR requirement. In a preferred embodiment, each of these powers is based on a combination of temperature, operating voltage, and the existing power level of PA output signal 114. The contents of maximum power lookup table can be determined by empirical methods. An exemplary empirical method comprises operating RF power amplification circuit 100 at various combinations of temperature, operating voltage, and PA output signal 114 power level to determine the maximum achievable power level within ACPR limits for each combination. Once this maximum power level is determined for a given combination, it is placed in the lookup table described above. In a preferred embodiment, this lookup table is stored in memory that is contained in processor 410.

In alternate embodiments, maximum power lookup table can store a function that is based on a theoretical formula. An exemplary formula is provided below:

LIMIT_N=max(min((a·BATT_N+b·TEMP_N+c·PO_N), d),e),

Where:
a, b, and c=a function or curve fit based on measured data from RF amplification circuit 100;
d=a value equal to a minimum allowed power level of PA output signal 114 to meet specified CDMA performance standards; and
e=a value equal to a maximum allowed power level of PA output signal 114 to meet FCC requirements.

Figure 9:
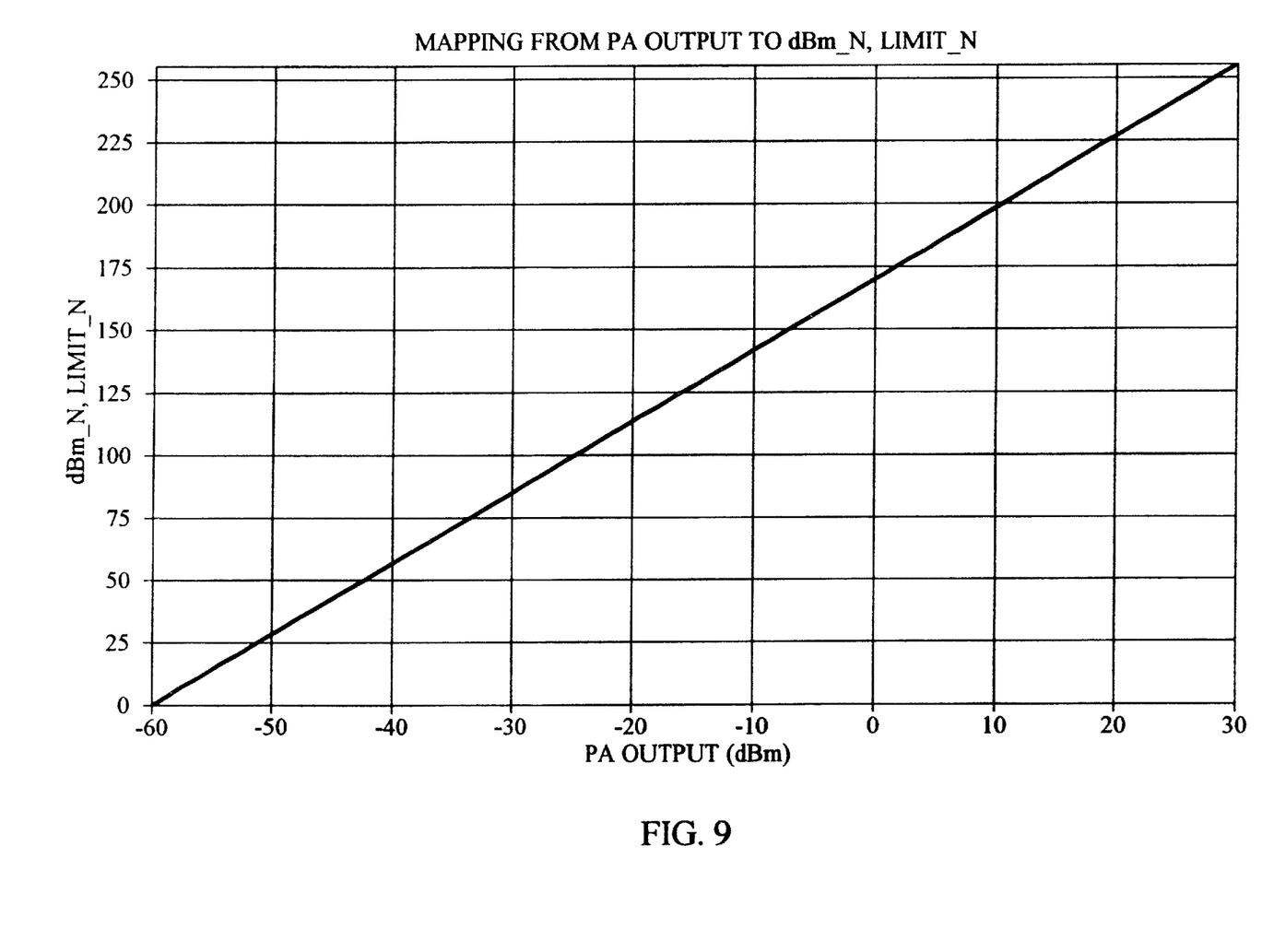
FIG. 9 illustrates the relationship between power levels and a digital power signal according to the invention.

FIG. 9 illustrates the relationship between power levels in decibels with respect to a milliwatt (dBm) and LIMIT_N 430. As stated above, LIMIT_N 430 is a digital signal that quantitatively represents the maximum allowable power level of PA output signal 114. In this figure LIMIT_N is a digital signal represented by eight bits. In a preferred embodiment, the correspondence or relationship between LIMIT_N units and the power level of PA output signal 114 in dBm is linear.

If RF amplification circuit 100 is powered by an external power source such as a car cigarette lighter, External power detected signal 422 is enabled. Processor 410 monitors external power detected signal 422. If this signal is enabled, processor 410 does not perform the algorithms described above. Rather, processor 410 sets LIMIT_N 430 to a predetermined value. In a preferred embodiment, this predetermined LIMIT_N 430 value is 255. When using the relationship defined in FIG. 9, this value corresponds to a PA output signal 114 power level of 29 dBm.

As described above, power limit register 412 receives LIMIT_N 430, from processor 410. Power limit register 412 also receives reverse link power control signal 118. Power limit register generates a dBm_N 432 signal and sends it to linearizer 414. dBm_N is a digital signal that quantitatively represents the desired power level of PA output signal 114. In a preferred embodiment, dBm_N 432 is a digital signal represented by eight bits.

Power limit register 412 compares the values of LIMIT_N 430 and reverse link power control signal 118. Based on this comparison, power limit register 412 generates dBm_N 432 according to the following equation:

dBm_N=min(LIMIT_N, reverse link power signal 118)

Effectively, the output of power limit register 412 is the minimum of LIMIT_N 430 and reverse link power control signal 118.

Linearizer 414 translates the desired dBm_N 432 signal into an AGC_N 434 signal. AGC_N 434 is an initial representation of AGC_V 122. In a preferred embodiment, AGC_N 434 is a digital signal represented by eight bits. After being generated, AGC_N 434 is sent to D/A converter 416.

Figure 10:
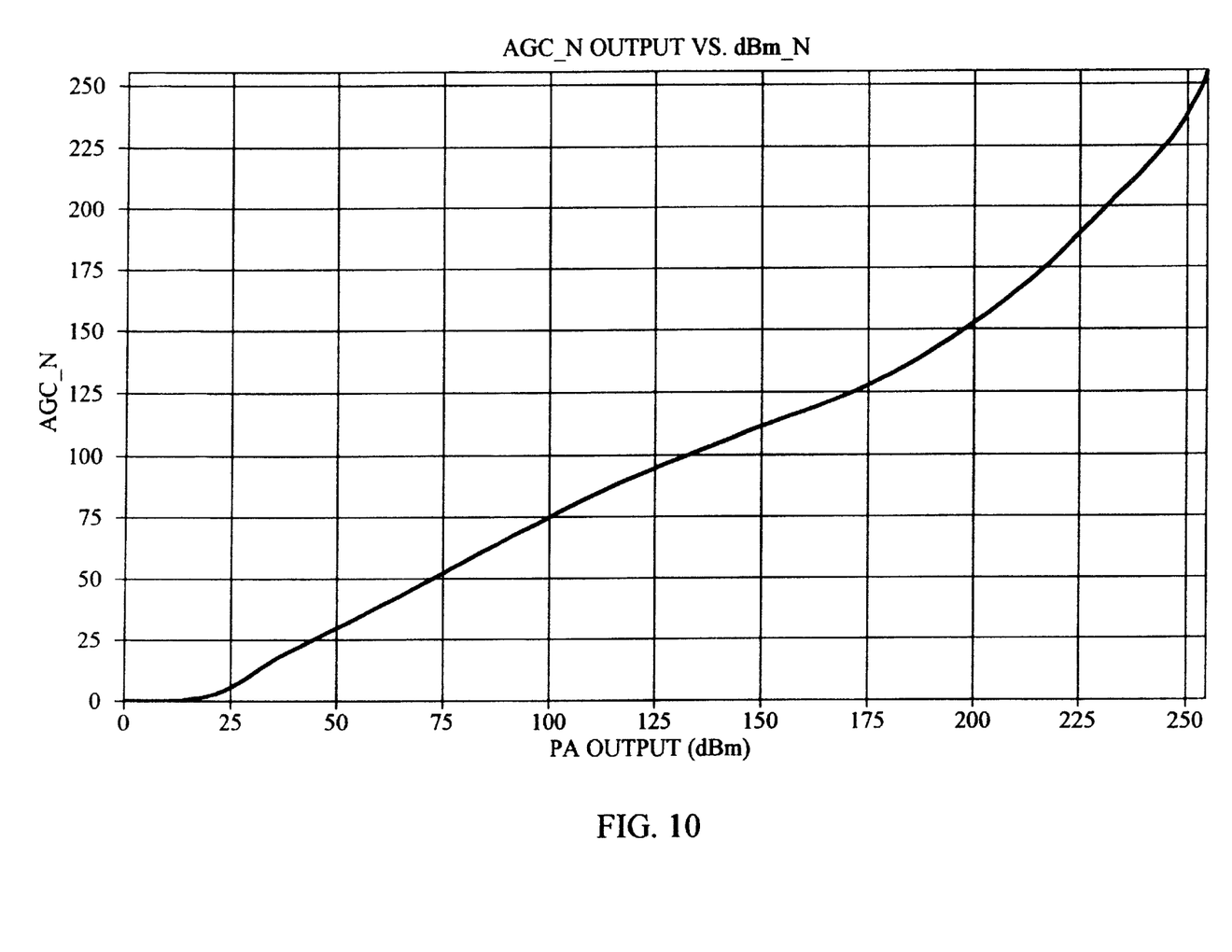
FIG. 10 illustrates the relationship between a digital power signal and a digital automatic gain control signal according to the invention.

FIG. 10 illustrates the relationship between dBm_N 432 and AGC_N 434. In a preferred embodiment, this relationship is substantially linear. However, at higher dBm_N 432 levels, this relationship becomes non-linear. This nonlinearity is purposefully added to correct for non-linear characteristics of AGC amplifier 108. AGC amplifiers 108 often have unique non-linear characteristics. Therefore, the relationship between dBm_N 432 and AGC_N 434 must be calibrated in each linearizer 414.

D/A converter 416 translates AGC_N 434 into AGC_V 122. AGC_V 122 is a DC voltage that controls the gain of AGC amplifier 108. In a preferred embodiment, CDMA transmit signal 104 has a fixed power level. Therefore, the gain of AGC amplifier 108 is the only variable that controls the power level of PA output signal 114.

Figure 11:
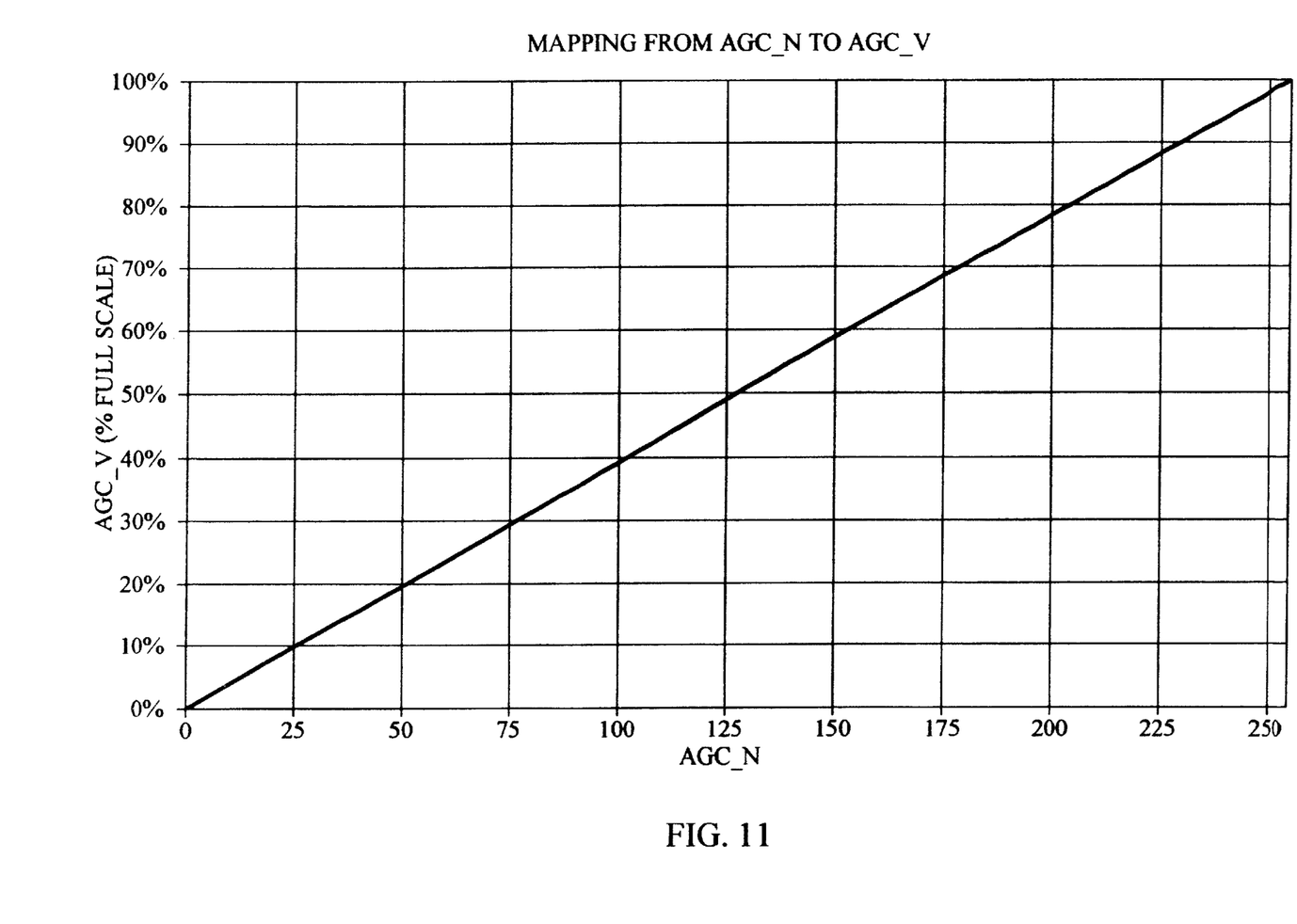
FIG. 11 is a curve illustrating the relationship between a digital automatic gain control signal and an analog automatic gain control signal according to the invention.

FIG. 11 is a curve illustrating the relationship between AGC_V 122 and AGC_N 434. In a preferred embodiment, this curve is linear. However, in alternate embodiments, this curve can have any shape.

Figure 12:
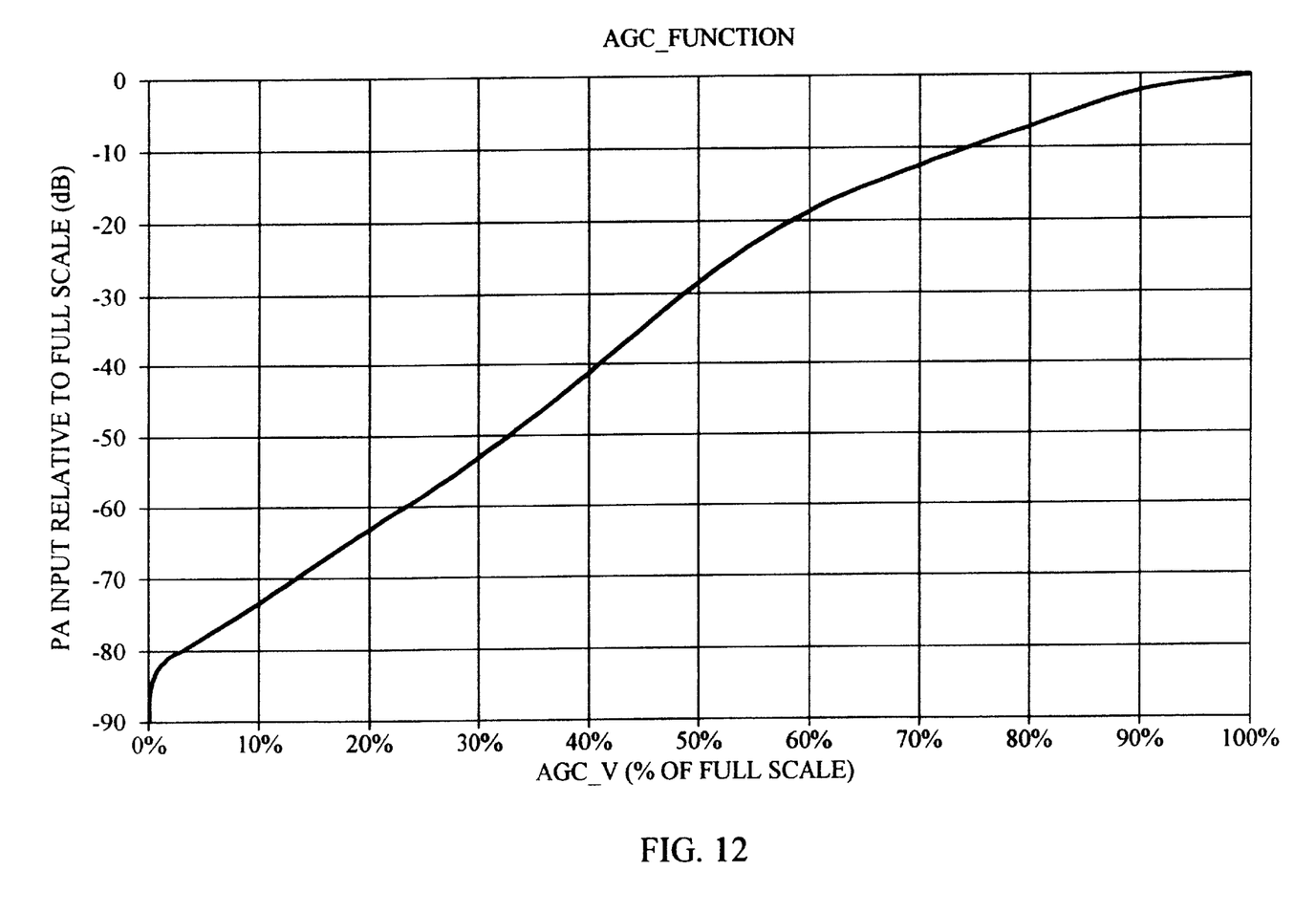
FIG. 12 is a curve illustrating the relationship between a PA input signal and an analog automatic gain control signal according to the invention.

FIG. 12 is a curve illustrating the relationship between PA input signal 110 and AGC_V 122. The curve is essentially linear. However, as AGC_V 122 increases, this relationship becomes non-linear. As discussed above with respect to FIG. 10, these non linear characteristics are corrected by linearizer 414.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of adjusting transmit power in a wireless phone to maintain adjacent channel power rejection (ACPR) passing margin, comprising the steps of:
   amplifying a first radio frequency (RF) signal according to a first gain to produce a second RF signal;
   amplifying said second RF signal according to a second gain to produce a third RF signal;
   determining a desired power level of said third RF signal;
   computing a new gain value from said desired power level; and
   adjusting said first gain to said new gain value,
   wherein said determining step comprises:
      determining a lookup address;
      accessing a maximum allowable power level of said third RF signal from the contents said lookup table address;
      receiving a reverse link power control signal; and
      setting said desired power level to the minimum of said maximum allowable power level and said reverse link power control signal.

2. The method of claim 1, wherein said lookup table address is based on an operating voltage.

3. The method of claim 1, wherein said lookup table address is based on an ambient temperature.

4. The method of claim 1, wherein said lookup table address is based on the power level of said third RF signal.

5. A system for adjusting transmit power in a wireless phone to maintain adjacent channel power rejection (ACPR) passing margin, comprising:
   means for amplifying a first radio frequency (RF) signal according to a first gain to produce a second RF signal;
   means for amplifying said second RF signal according to a second gain to produce a third signal;
   means for determining a desired power level of said third RF signal;
   means for computing a new gain value from said desired power level; and
   means for adjusting said firs gain to said new gain value,
   wherein said means for determining a desired power level of said third RF signal comprises:
      means for determining a lookup address;
      means for accessing a maximum allowable power level from the contents of said lookup table address;
      means for receiving a reverse link power control signal; and
      means for setting said desired power level to the minimum of said maximum allowable power level and said reverse link power control signal.

6. The system of claim 5, wherein said lookup table address is based on an operating voltage.

7. The system of claim 5, wherein said lookup table address is based on an ambient temperature.

8. The system of claim 5, wherein said lookup table address is based on the power level of said third RF signal.

9. A system for adjusting transmit power in a wireless phone to maintain adjacent channel power rejection (ACPR) passing margin, comprising:
   an automatic gain control (AGC) amplifier having an AGC input terminal, an AGC output terminal, and a control signal input terminal;
   a power amplifier (PA) having a PA input terminal and a PA output terminal, wherein said PA input terminal is connected to said AGC output terminal; and
   an output power controller having a controller input terminal and a controller output terminal, wherein the controller input terminal is connected to said PA output terminal and the controller output terminal is connected to said AGC input terminal,
      wherein said output power controller further comprises:
      means for calculating a maximum allowable transmit power level;
      means for determining a desired transmit power level;
      means for setting said desired transmit power level to the minimum of the maximum allowable power level and the reverse link power control signal;
      means for converting said desired transmit power level to an AGC signal; and
      means for sending said AGC signal across said controller output terminal to said control signal input terminal.

10. The system of claim 9, wherein said means for determining a desired transmit power level comprises:
    means for determining a lookup table address; and
    means for accessing said desired power level from the contents of said lookup table address.

11. The system of claim 10, wherein said lookup table address is based on an operating voltage.

12. The system of claim 10, wherein said lookup table address is based on an ambient temperature.

13. The system of claim 10, wherein said lookup table address is based on a current transmit power level.

14. A system for adjusting transmit power in a wireless phone to maintain adjacent channel power rejection (ACPR) passing margin, comprising:
    an automatic gain control (AGC) amplifier having an AGC input terminal, and AGC ouput terminal, and a control signal input terminal;
    a power amplifier (PA) having a PA input terminal and a PA output terminal, wherein said PA input terminal is connected to said AGC output terminal; and
    an output power controller having a controller input terminal and a controller output terminal, wherein the controller input terminal connected to said AGC output terminal and the controller output terminal is connected to said AGC input terminal,
       wherein said output power controller further comprises:
       means for calculating a maximum allowable transmit power level;
       means for determining a desired transmit power level;
       means for converting said desired transmit power level to an AGC signal; and
       means for sending said AGC signal across said controller ouput terminal to said control signal input terminal; and wherein said means for determining a desired transmit power level comprises:
- means for determining a maximum allowable transmit power level;
- means for receiving a reverse link power control signal; and
- means for setting said desired transmit power level to the minimum of said maximum allowable transmit power level and said reverse link power control signal.

15. The system of claim 14, wherein said means for determining a maximum allowable transmit power level comprises:
- means for determining a lookup table address; and
- means for accessing said maximum allowable transmit power level from the contents of said lookup table address.

16. The system of claim 15, wherein said lookup table address is based on an operating voltage.

17. The system of claimed 15, wherein said lookup table address is based on an ambient temperature.

18. The system of claim 15, wherein said lookup table address is based on a current transmit power level.

* * * * *